Figure 1:
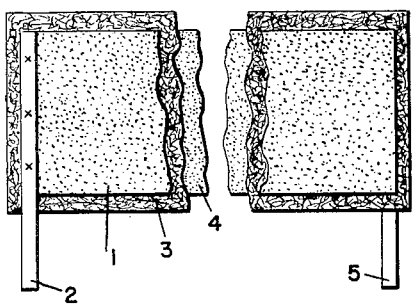

Dec. 18, 1951     R. M. BRENNAN     2,579,250
ELECTROLYTIC CONDENSER FOR USE
ON ALTERNATING CURRENT DEVICES
Filed June 3, 1948

INVENTOR.
Robert M. Brennan
BY
West & Oldham
attorneys

Patented Dec. 18, 1951

2,579,250

UNITED STATES PATENT OFFICE 2,579,250

ELECTROLYTIC CONDENSER FOR USE ON ALTERNATING-CURRENT DEVICES

Robert M. Brennan, Cleveland, Ohio

Application June 3, 1948, Serial No. 30,998

6 Claims. (Cl. 175—315)

This invention relates to electrolytic condensers for use on alternating current devices such as for motor starting.

Heretofore it has been impossible to make electrolytic condensers commercially saleable for use on alternating current wherein the electrodes are made of spray deposited porous aluminum strips. Heretofore spray deposited aluminun electrode foils have only been used commercially as anodes on direct current.

By my invention it is practicable and advantageous to make alternating current condensers of spray deposited porous aluminum foils with low power factor losses less than 10% where heretofore any attempt to make alternating current condensers using porous spray deposited aluminum foils as electrodes resulted in power factor losses of over 10% and generally 15% to 20% or more.

I accomplish the purposes of my invention by using thin porous flexible spray deposited electrodes less than .010" and preferably less than .0085" in thickness and having substantially equal area exposed to the electrolyte and flexible and substantially equally porous throughout.

A pair of such electrodes are electroformed and interwound using porous spacers and impregnated with electrolyte by immersion and the electrodes themselves are filled with electrolyte in their pores, preferably after winding by soaking the winding in hot electrolyte.

The spacers according to my invention are not over .015" in thickness and preferably about .005"-.007" or less in thickness and are preferably multiple and absorbent.

I find that by using electrodes less than .010 in thickness and having the capacity of each electrode approximately the same as the other I get power factor losses of less than 10% and as low as 3%.

Heretofore no porous plate alternating current condensers have been satisfactory commercially, because the power factor losses were too great.

It is also essential according to my invention that both electrodes as used on alternating current be so porous and so thin that light readily passes therethrough over substantially all of the active exposed area of each electrode.

Such electrode material can be made by spraying onto a fibrous base which is of high purity known as electrolytic grade uncalendered, or only slightly calendered, low density wet laid paper, for example, or on dry laid pressed cotton batting.

I attribute the low power factor losses of alternating current condensers made according to my invention to the open porosity combined with the thinness of the electrodes combined with the fact that each electrode is of substantially equal external plus internal area in contact with the electrolyte.

In alternating current capacitors made according to my invention each electrode of a pair, for example, displaces approximately an equal amount of electrolyte and retains within its body a substantially equal amount of electrolyte one to the other.

It is, of course, possible to extend one electrode beyond the other endwise or sidewise, but such does not improve the power factor of the condenser, but makes the power factor loss greater.

The face to face areas of the electrodes are required to be of substantially equal capacity and preferably of substantially equal thinness and preferably at least less than .011" in thickness according to my invention.

The thinness of the porous plate or foil according to my invention shortens the average interelectrode ionic path and brings the internal resistance of each electrode to a desired low value so that the loss due to electrolytic resistance is satisfactory, though the capacity per unit of plane area of the porous plate is six to ten times that of plane foil.

The relatively equal effective capacity of each of a pair of electrodes keeps the distribution of current density on and in the electrolyte contacting areas of the porous electrodes uniform, so that no hot areas exist which might contribute to the breakdown or high leakage of the film on each electrode. This feature also keeps the film in a well formed condition during use because there are no high leakage localized areas.

The balanced current density due to the balanced porous equality of area of each electrode keeps the film equally well formed on each opposite electrode, so that the leakage on each electrode remains low and in balance. The thinness of my porous plates facilitates formation on a cycling current. In fact, it is possible to form raw plates of thin porous aluminum on alternating current to low leakage values by connecting separate porous electrodes on separate phases of an alternating current source in a common electrolyte, the electrodes preferably being equally spaced and equally immersed in the electrolyte and each containing an equal amount of electrolyte.

The shelf life of these alternating current condensers made according to my invention is extremely good because of the monometal construction used without any prior treatment which requires precleaning before formation.

Due to the fact that the face to face capacity of each of a pair of alternating current electrodes are substantially equal, the energy dissipation and the film breakdown and reformation in each electrode is kept in balance because each electrode has a substantially equal amount of stress distributed therefrom. The oxidation and amount of dielectric on each electrode is kept substantially equal so that there are no substantially different amounts of dielectric in equal adjacent portions of opposite electrodes. In referring to a dielectric in the present application, I refer to the oxide film which is electro-formed on each electrode usually prior to its assembly into a condenser. All the other alternating current electrolytic motor starting capacitors sold in this country at present, as far as I know, have etched electrodes to give added capacity. It is known that remnants of the etchants are present generally in manufactured units now sold and these corrosive foreign agents lead to short life. With my invention pure aluminum 99.8% or purer is used and no cleaning or etching is needed prior to formation. The monometal construction eliminates metallic potential differences.

By "substantially equal" as used herein, I mean a variation of less than 31% and I generally attain a variation of less than 10% in practice of my invention under favorable conditions and with care.

Figure 2:
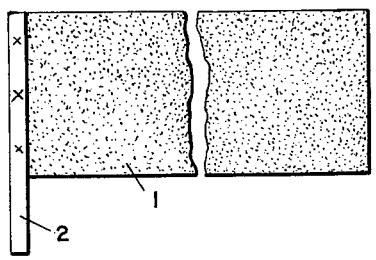
Figure 3:
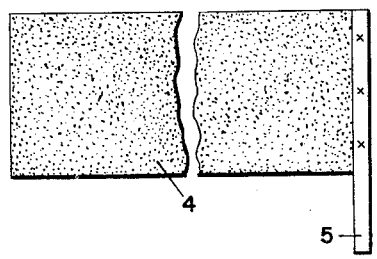
Figure 4:
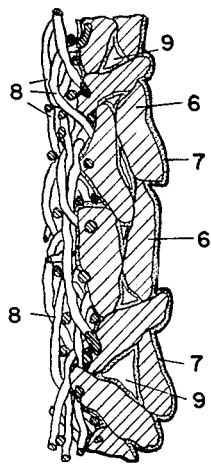
Figure 5:
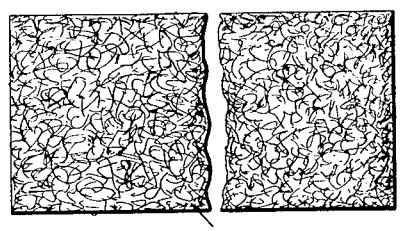
Figure 6:
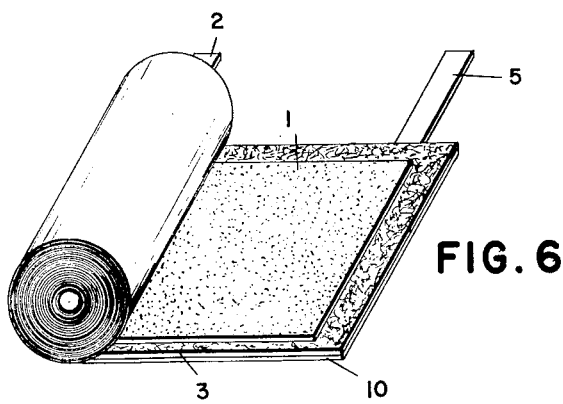

In the accompanying drawings:

Fig. 1 is an elevation, partially broken away, of a portion of a condenser embodying the principles of the invention;

Figs. 2, 3, and 5 are, respectively, elevations of the anode, cathode and separator shown in Fig. 1;

Fig. 4 is an enlarged fragmentary sectional view of a portion of an electrode of the invention; and Fig. 6 is a perspective view of a condenser assembly of the invention, with one portion thereof being unrolled from the remainder of the condenser that is in rolled form.

Referring in detail to the structure shown in the accompanying drawing, a porous anode electrode 1 is shown which electrode has been produced in accordance with the principles of the invention. This electrode 1 has a terminal strip 2 suitably secured thereto and extending therefrom while a conventional porous spacer or separator 3 shown positioned adjacent one surface of the electrode 1 and extending therebeyond. A porous cathode electrode 4 is shown and it has a corresponding terminal 5 suitably secured thereto. These electrodes 1 and 4 are of substantially the same size and have the same active area, being sufficiently porous to permit light to readily pass therethrough.

Fig. 4 best shows that the individual electrodes are made up from a plurality of aluminum particles 6 which have been spray deposited in such a manner that the adjacent aluminum particles coalesce and overlap with each other but which provide a plurality of interstices or voids 9 between the different aluminum particles. These aluminum particles 7 normally are spray deposited upon the fibrous material 8 and they thereafter are so processed or so "formed" as to provide a layer of aluminum oxide film 7 over the exposed surfaces of the metallic particles.

Fig. 6 shows that an additional separator 10 may be added to the remaining exposed surface of the cathode electrode 4 prior to rolling the electrode assembly unit into a coiled condenser.

Having described my invention, what I claim is:

1. An alternating current capacitor comprising porous particulate flexible film forming perforate interfacially permeable electrodes and a film forming conductive electrolyte therebetween and therein of substantially equal amount for adjacent equal areas of opposite electrodes, which electrodes will transmit light therethrough and have within 10% the same total active internal and external areas, each electrode being less than .011" in thickness.

2. An alternating current capacitor comprising a pair of porous particulate thin metallic electrodes of substantially equal weight, which electrodes will transmit light therethrough and have within 10% the same total active internal and external areas, each electrode being less than .011" in thickness.

3. An alternating current capacitor comprising a pair of porous particulate flexible permeable conductive electrodes of film forming metal assembled in uniformly spaced aligned relationship, each electrode being of substantially equal porosity throughout, each of said electrodes being less than .0085" in thickness and having a dielectric film over the surfaces thereof.

4. An alternating current capacitor comprising at least two porous particulate flexible film forming perforate electrodes with a film forming electrolyte therebetween and in the interstices thereof, the coextensive portions of each of the adjacent electrodes containing within 10% of the same amount of electrolyte.

5. An alternating current capacitor comprising a pair of porous particulate permeable, flexible conductive electrodes of film forming metal with a film forming electrolyte therebetween and in the interstices thereof, the electrodes having coextensive portions and the coextensive portions of adjacent electrodes containing within 10% of the same amount of total internal and external surfaces in contact with the electrolyte, each of said electrodes being less than .0085" in thickness and with the capacitor having a power factor of between about 3 to 10%.

6. An alternating current capacitor comprising a pair of porous particulate permeable, flexible conductive electrodes of film forming metal with a film forming electrolyte therebetween and in the interstices thereof, the electrodes having coextensive portions and the coextensive portions of adjacent electrodes containing within 10% of the same amount of total internal and external surfaces in contact with the electrolyte, each of said electrodes being light transmitting and being less than .010" in thickness.

ROBERT M. BRENNAN.

REFERENCES CITED

The following references are of record in the file of this patent:

UNITED STATES PATENTS

| Number | Name | Date |
|---|---|---|
| 2,066,912 | Ruben | Jan. 5, 1937 |
| 2,375,211 | Brennan | May 8, 1945 |
| 2,404,824 | Booe | July 30, 1946 |
| 2,412,201 | Brennan | Dec. 10, 1946 |

OTHER REFERENCES

Electrolytic Capacitors, pages 233 to 241 only, by Paul McKnight Deeley. The Cornell-Dubilier Electric Corp., South Plainfield, New Jersey, 1938.